United States Patent
Nitsan et al.

(10) Patent No.: US 10,489,265 B2
(45) Date of Patent: Nov. 26, 2019

(54) MONITORING APPLICATION OPERATIONS USING USER INTERACTION TIMES

(71) Applicant: ENTIT Software LLC, Sunnyvale, CA (US)

(72) Inventors: Amichai Nitsan, Yehud (IL); Haim Shuvali, Yehud (IL); Hana Giat, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 94 days.

(21) Appl. No.: 15/564,552

(22) PCT Filed: Apr. 30, 2015

(86) PCT No.: PCT/US2015/028651
§ 371 (c)(1),
(2) Date: Oct. 5, 2017

(87) PCT Pub. No.: WO2016/175863
PCT Pub. Date: Nov. 3, 2016

(65) Prior Publication Data
US 2018/0089051 A1 Mar. 29, 2018

(51) Int. Cl.
*G06F 11/34* (2006.01)
*G06F 9/44* (2018.01)
(Continued)

(52) U.S. Cl.
CPC ............ *G06F 11/3419* (2013.01); *G06F 9/44* (2013.01); *G06F 11/30* (2013.01);
(Continued)

(58) Field of Classification Search
None
See application file for complete search history.

(56) References Cited

U.S. PATENT DOCUMENTS 7,613,281 B2   11/2009  Kumar et al.
2006/0026179 A1*  2/2006  Brown ................. G06F 16/217
(Continued)

FOREIGN PATENT DOCUMENTS

WO    WO-2014166523 A1    10/2014

OTHER PUBLICATIONS

Tracking Behavioral Changes in Distributed Systems Using Distalyzer.
WebQuilt: A Visual Analysis Tool for Understanding Web Usability Clickstream Data.
(Continued)

*Primary Examiner* — Craig C Dorais

(57) ABSTRACT

A plurality of application requests from an application may be monitored, with each of the application requests associated with an instance of a plurality of instances of a user interaction with the application. A request response time for each of the application requests may be determined. A user interaction time for each of the plurality of instances of the user interaction with the application may be obtained. From the plurality of instances, slow instances that have a user interaction time greater than a slow threshold may be selected, with each of the slow instances comprising a selected application request of the plurality of application requests. For the slow instances, the request response times of the selected application requests may be averaged to generate an average request response time. A comparison request response time for the selected application request may be determined.

20 Claims, 17 Drawing Sheets

(51) Int. Cl.
*G06F 11/30* (2006.01)
*H04L 29/08* (2006.01)
*H04L 29/06* (2006.01)

(52) U.S. Cl.
CPC .......... *G06F 11/3495* (2013.01); *H04L 67/22* (2013.01); *H04L 69/28* (2013.01); *G06F 2201/81* (2013.01); *G06F 2201/865* (2013.01); *G06F 2201/875* (2013.01)

(56) References Cited

U.S. PATENT DOCUMENTS

| | | |
|---|---|---|
| 2008/0016214 A1* | 1/2008 | Galluzzo .............. H04L 67/322 709/226 |
| 2011/0125832 A1 | 5/2011 | Dahl |
| 2012/0159402 A1 | 6/2012 | Nurmi et al. |
| 2013/0054779 A1 | 2/2013 | Cradick et al. |
| 2013/0081025 A1 | 3/2013 | Nardelli et al. |
| 2013/0346917 A1 | 12/2013 | Bragdon et al. |
| 2014/0149538 A1* | 5/2014 | Deeter ................... H04L 67/26 709/217 |
| 2014/0280862 A1 | 9/2014 | Aurisset |
| 2014/0380282 A1 | 12/2014 | Ravindranath et al. |

OTHER PUBLICATIONS

International Searching Authority., International Search Report and Written Opinion dated Dec. 23, 2015 for PCT Application No. PCT/US2015/028651 Filed Apr. 30, 2015, 9 pgs.

\* cited by examiner

MACHINE-READABLE STORAGE MEDIUM 1000

Instructions to monitor a plurality of instances of a user interaction with an application, the user interaction comprising a plurality of application operations that each have an operation time 1004

Plurality of application operations are asynchronous operations 1008

Instructions to obtain a user interaction time for each of the user interaction instances 1012

Instructions to determine an amount of variation of the user interaction times among the user interaction instances 1016

Amount of variation is a standard deviation of the plurality of operation times 1020

Instructions to create a plurality of temporal groupings based on the amount of variation 1024

Instructions to match each of the user interaction instances with one of the temporal groupings based on the user interaction time of the user interaction instance 1028

Instructions to, for each of the temporal groupings, determine an average operation time for a selected application operation 1032

FIG. 10A

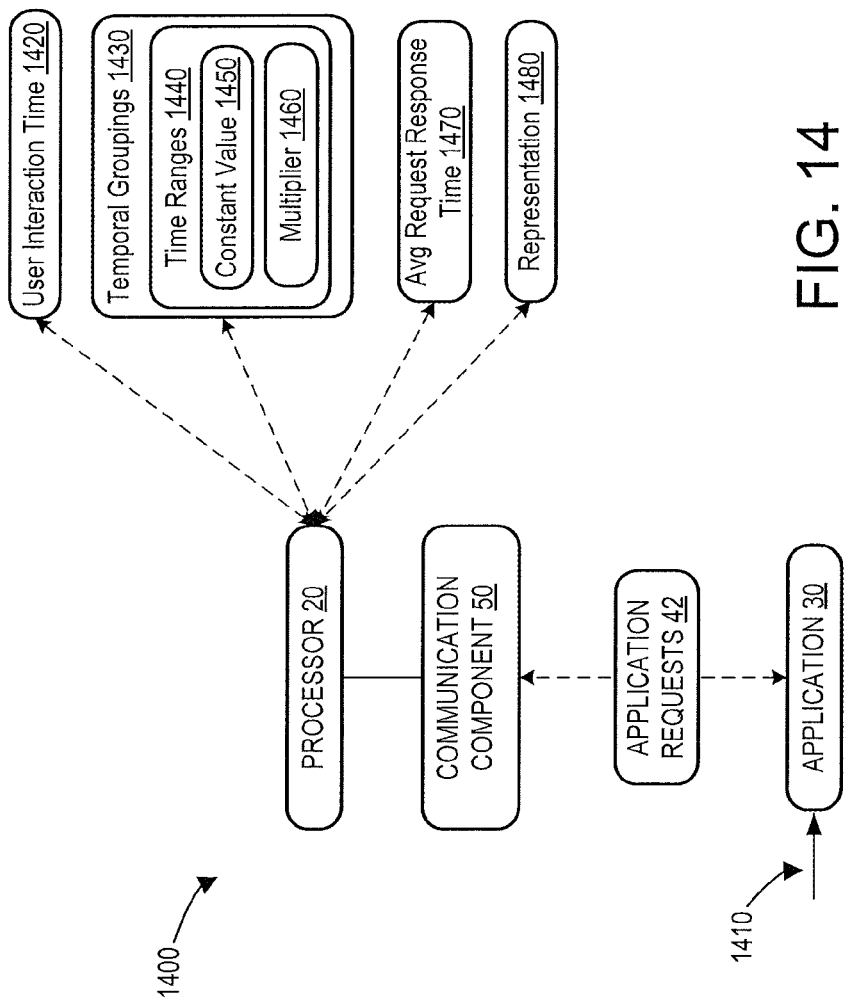

MONITORING APPLICATION OPERATIONS USING USER INTERACTION TIMES

BACKGROUND

Applications may operate with varying levels of performance. Data related to an application's operation may be analyzed to evaluate the application's performance.

BRIEF DESCRIPTION OF THE DRAWINGS

FIGS. 10A and 10B are a block diagram of a non-transitory machine-readable storage medium containing instructions according to an example of the present disclosure.

FIG. 14 is a block diagram of an example computing system according to an example of the present disclosure.

DETAILED DESCRIPTION

Figure 1:
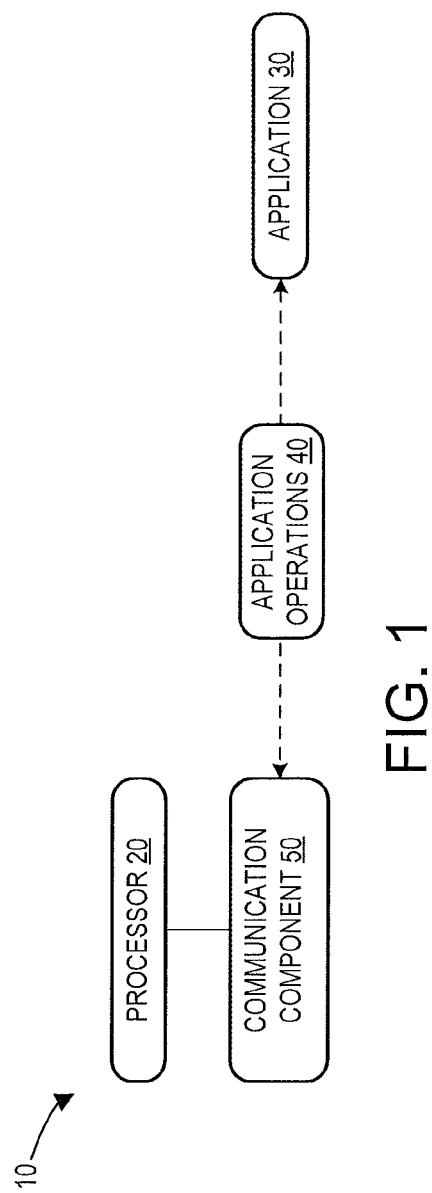
FIG. 1 is a block diagram of an example computing system according to an example of the present disclosure.

When using an application, there are a number of potential reasons why a user may have a less than satisfactory user experience. In some examples, the application itself may experience performance issues that cause undesirable delays during user interactions. In some examples, an internal or external network by which the application communicates may be slow. In other examples in which an application uses multiple domains, some but not all of the domains may suffer from performance issues. In some examples, application performance issues may be client issues that are unrelated to application or network performance.

Some application performance monitoring solutions may track individual application operations, such as network requests such as HTTP requests, database queries, file reading operations, and the like. For example, some application performance monitoring solutions may track HTTP requests from clients to servers. Each HTTP request may be tracked independently of the other requests and without regard to the user interaction with which it is associated. In these solutions the HTTP requests may be aggregated by HTTP request type, such as a URL classification. The aggregations may be averaged for each HTTP request type. For example, where a user interaction of a particular type includes an application making requests to a first URL and a second URL, all of the requests to the first URL may be grouped and averaged over multiple interactions, and all of the requests to the second URL may be grouped and averaged over multiple interactions.

In some examples, different application operations may have different impacts on the user experience. For example, a user interaction may comprise a user input followed by a display of data. The total time from user input to the display of the data may be 6 seconds. In some examples, the user input may trigger a first HTTP request to a first URL that takes 4 seconds to bring the data to the application. The user input also may trigger a second HTTP request to a second URL that provides a notification to a third party service. An acknowledgement from the third party service may take 8 seconds to be received. However, the receipt of the acknowledgement may not affect the display of the data from the first URL, and therefore may not affect the user's experience. Accordingly, shortening the longer, 8 second response time of the second HTTP request may not affect the user experience. By contrast, shortening the shorter, 4 second response time of the first HTTP request may enhance the user experience.

With respect to the example above, in some examples performance monitoring solutions may identify the longer, 8 second response time of the second HTTP request as a root cause of a performance issue instead of the shorter, 4 second response time of the first HTTP request. Accordingly, although the second, shorter HTTP request has a greater negative effect on user experience, the first, longer HTTP request may be identified as a root cause.

In some examples, a root cause of a performance issue may lie in client-side activity or network activity that is unrelated to application performance or corresponding HTTP requests. In these examples, a reported response time increase in a particular HTTP request may be prioritized, and may mislead a user into analyzing the corresponding URL for issues.

In some non-mobile applications, such as java applications, application operations may be synchronous. For synchronous operations, a profiler may track a complete user interaction, and may determine the overall user interaction time along with individual response times of each operation associated with the interaction. In some mobile applications, such as Android and iOS applications, operations may be asynchronous. For these asynchronous operations, some profilers may be unable to determine user interaction times and associated operation times.

The present disclosure describes examples of systems, methods and non-transitory machine-readable storage media for user interactions with an application. As described in more detail below, in some examples a computing system may comprise a processor and a communication component to monitor a plurality of application operations from an application. The processor may monitor, via the plurality of application operations, a plurality of instances of a user interaction with an application. The processor may obtain a user interaction time for each of the user interaction instances, and determine an average user interaction time for the plurality of user interaction instances.

The processor may determine an amount of variation of the user interaction times among the user interaction instances. The processor may create a plurality of temporal groupings that each comprises a time range based on the average user interaction time and the variation of the user interaction times. The processor may match each of the user interaction instances with one of the temporal groupings using the user interaction time of the user interaction instance. For each of the temporal groupings, the processor may determine an average operation time for a selected application operation, and may output a representation of the operation time. Examples of application operations include, but are not limited to, network requests such as HTTP requests, database queries, file reading operations, and any other operations that may be timed.

In one example of the present disclosure, FIG. 1 shows a block diagram of a system 10 for user interactions with an application. As described in more detail below, in some examples the system 10 may include a processor 20 that executes instructions for monitoring instances of a user interaction with an application 30, with the user interactions comprising application operations 40 that each have an operation time corresponding to the length of time for the operation to be completed. In the some examples, the instructions may be stored in a storage, e.g. a non-transitory machine-readable storage medium, that is communicatively coupled to processor 20.

The system 10 may include a communication component 50 that is communicatively coupled to the processor 20. The communication component 50 may monitor application operations 40 from the application 30, which may include receiving application operations in the form of application requests. Communication component 50 may include wired and/or wireless communication devices compatible with at least one communication protocol. In some examples, the communication component 50 may be to provide communication via a wireless local area network, a wired local area network, a wireless wide area network, a wired wide area network, a wireless telephone network, etc.

The processor 20 may include at least one physical device to execute at least one instruction. For example, the processor 20 may be to execute instructions that are stored on a non-transitory machine-readable storage medium. Such instructions may be part of at least one application, service, program, routine, library, object, component, data structure, or other logical construct. Such instructions may be implemented to perform a task, implement a data type, transform the state of at least one device, or otherwise arrive at a desired result.

Figure 2:
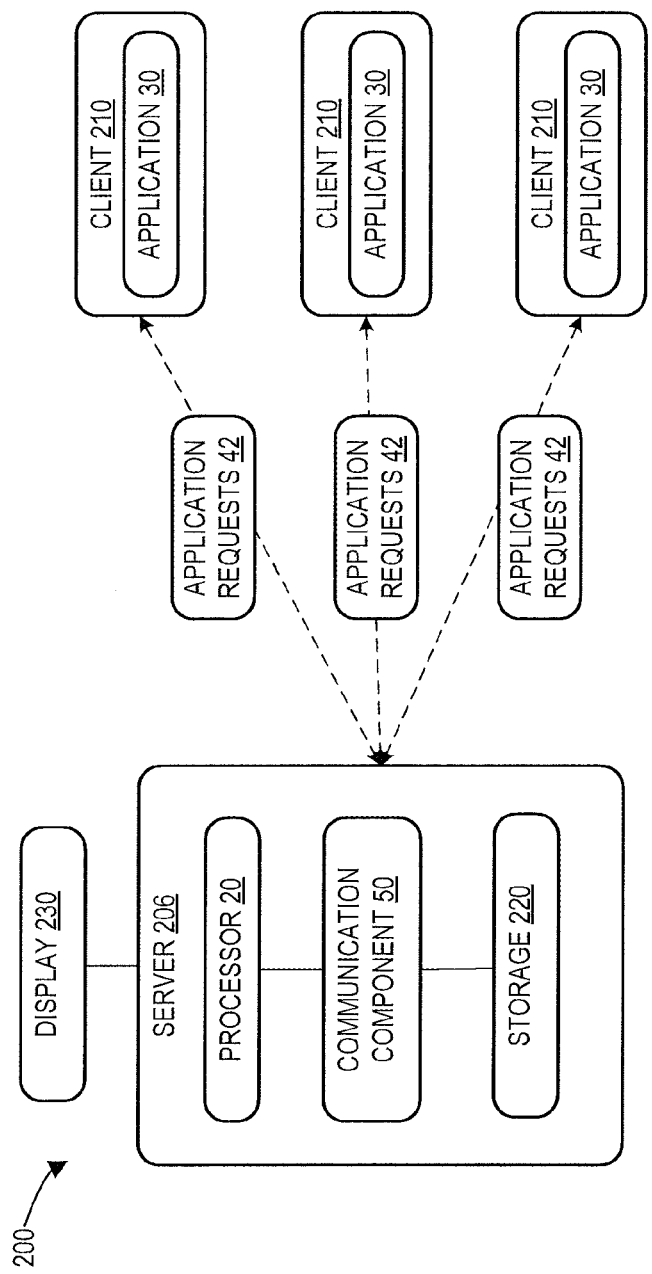
FIG. 2 is a block diagram illustrating an example computing system and client devices according to an example of the present disclosure.

FIG. 2 shows a block diagram of a system 200 for user interactions with an application according to another example of the present disclosure. In this example the system 200 comprises a server 206 that receives application requests 42 from a plurality of applications 30 located on a plurality of client devices 210. In examples, client devices 210 may take the form of mobile devices such as mobile phones, smart phones or other communication device, wearable computing devices, laptops, notebooks or tablet computers, or other suitable types of computing devices. In some examples, client devices 210 may take the form of desktop computers, servers, or other suitable types of computing devices. While the example of FIG. 2 shows three client devices 210 in communication with server 206, in some examples less or more client devices 210 may be in communication with server 206.

Server 206 may include storage 220 for storing instructions executable by the processor 20. As described in more detail below, in some examples storage 220 may include non-transitory machine-readable storage media such as removable media and/or built-in devices, optical memory devices such as CD, DVD, HD-DVD, Blu-Ray Disc, and the like, semiconductor memory devices such as RAM, EPROM, EEPROM, and the like, and/or magnetic memory devices such as hard disk drive, floppy disk drive, tape drive, MRAM, and the like, among others. Storage 220 may include memory devices with at least one of the following characteristics: volatile, nonvolatile, dynamic, static, read/write, read-only, random access, sequential access, location addressable, file addressable, and content addressable.

In some examples server 206 may be communicatively coupled to a display 230. As described in more detail below, in some examples the processor 20 may output representations of average operation times for application operations, such as average request response times for application requests, and alerts indicating various issues.

In some examples the server 206 may receive a plurality of application requests 42 from an application, where each of the application requests is associated with an instance of a plurality of instances of a user interaction with the application. For example, a user of a client device 210 may launch a password manager application. The password manager application may be instrumented with a wrapper that may send data relating to user interactions with the application to the server 206.

In one example, the user may input the user's master password into an input field displayed via the password manager application on client device 210. The user may then select a log-in button displayed on the client device 210. Upon selection of the log-in button, the application may make multiple application requests, such as HTTP requests, to the server to authenticate the user and to display a home screen on the client device.

In some examples, the time between a user's initiation of a particular application task, request, or other user interaction with an application, such as a log-in interaction, and the completion of that user interaction may be defined as a user interaction time. Each instance of a user interaction may have a corresponding user interaction time. For example, in the above example the time between the user's selection of the log-in button and the display of the application's home screen may be the user interaction time for this instance of the user's interaction with the password manager application.

In some examples, a user interaction with an application may comprise a plurality of application requests from the application to a server. In some examples, the time between sending one application request and receiving a response to the request from the server may be defined as a request response time. In some examples, for a given user interaction the user interaction time may be the sum of the request response times for each of the application requests performed in the user interaction.

In some examples, the application requests may comprise asynchronous requests. In some examples, server 206 may receive data relating to multiple different user interactions of different types, with some of the different user interactions sending asynchronous application requests. Some of these various asynchronous application requests from different user interaction types may be sent to the same URL. For example, in the password manager application example, a server may receive data relating to different user interactions such as creating an account, logging-in, updating user data, viewing saved sites, etc.

In some examples, each of various application requests may be associated with one of a plurality of user interaction types. For example, when a first asynchronous request is created during a first instance of a user interaction Z, a correlation between the first asynchronous request and user interaction Z may be identified and registered. At a subsequent time, when another instance of user interaction Z occurs and the first asynchronous request is received, the request is identified as being associated with this user interaction type. In this manner, and as described in more detail below, multiple application requests may be attributed to a particular user interaction type, and may be correspondingly aggregated.

Figure 3:
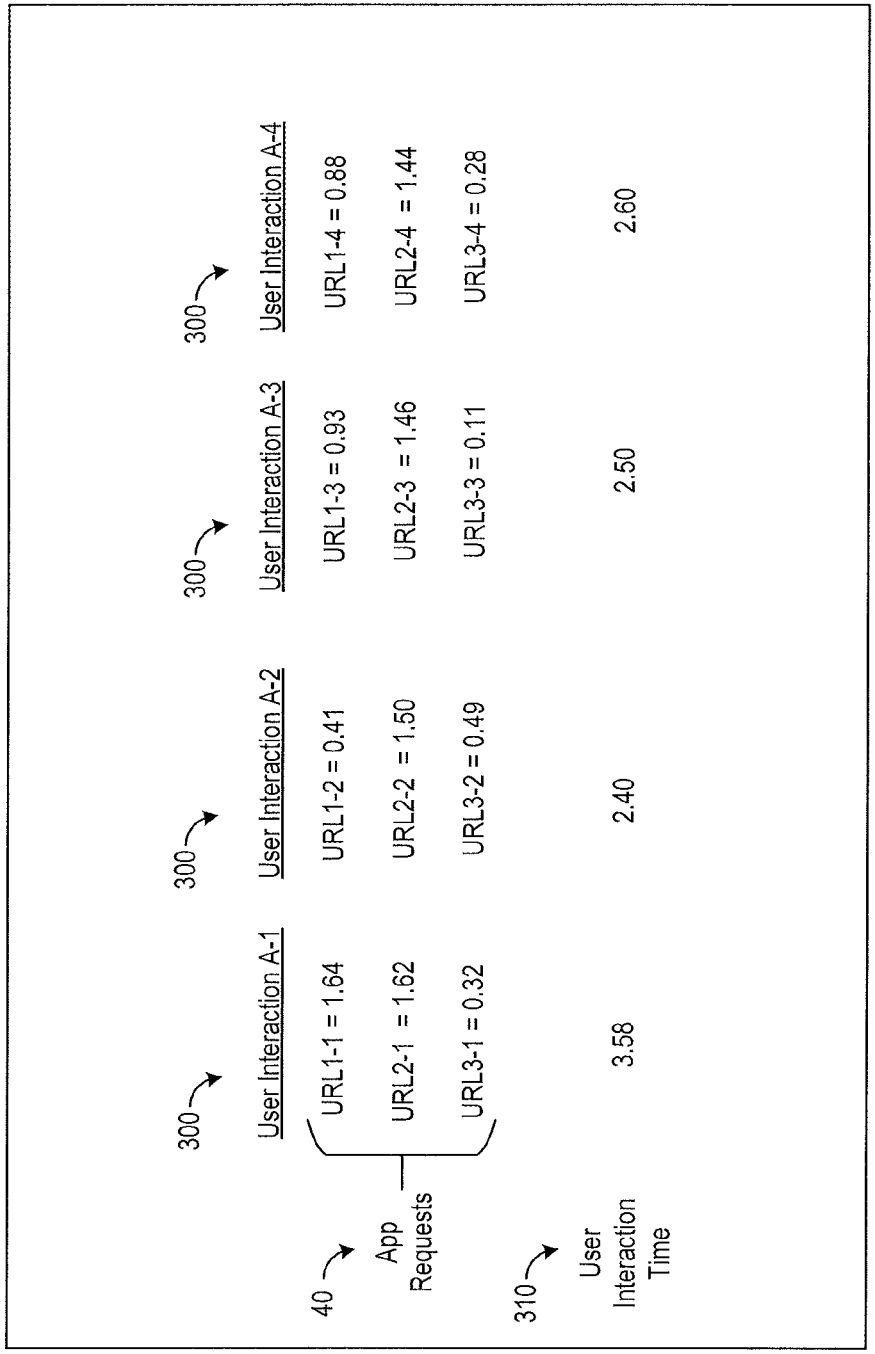
FIG. 3 shows example user interaction instances, user interaction times and request response times according to an example of the present disclosure.

With reference now to FIG. 3, an example of user interaction instances, user interaction times and request response times for a user interaction is provided. In this example, 4 instances 300 of a user interaction A have been received and are denoted as user interactions A-1, A-2, A-3 and A-4. In other examples, fewer or more instances of a user interaction may be utilized. The user interaction A includes 3 application requests 40 to URL1, URL2 and URL3. In other examples, user interactions may include fewer or more application requests.

For each of the 4 instances 300, a request response time for each of the 3 application requests is determined. For example, for user interaction A-1, application request URL1-1 has a request response time of 1.64 seconds, URL2-1 has a request response time of 1.62 s., and URL3-1 has a request response time of 0.32 s. For each of the 4 instances 300, a user interaction time 310 is obtained, where obtaining the user interaction time may comprise determining, calculating, reading and/or otherwise acquiring the user interaction time. In this example, the user interaction time 310 is the sum of the 3 request response times for the user interaction. For example, user interaction A-1 has a user interaction time of 1.64+1.62+0.32=3.58 s.

In some examples, a slow threshold may be selected for the user interaction time of a user interaction. In some examples, a user experience may be adversely impacted, e.g. may have a less-than-desired experience with the application, when the user interaction time is above the slow threshold. In the example of FIG. 3, a slow threshold may be 2.55 s. In some examples, the slow threshold may be received via user input. In other examples, the slow threshold may be programmatically determined via instructions executed on a processor 20.

In some examples, slow instances of user interaction A that have a user interaction time greater than-the slow threshold may be selected. In the example of FIG. 3, user interaction instances A-1 and A-4 have user interaction times greater than a slow threshold of 2.55 s. In this example, slow user interaction instances A-1 and A-4 may be grouped into a slow group. Within this slow group, the request response times for each of the 3 application requests URL1, URL2 and URL3 may be averaged to generate a first average request response time for each of the 3 application requests. For example, in this slow group, instance A-1 includes URL1-1 having a request response time of 1.64 s, and instance A-4 includes URL1-4 having a request response time of 0.88 s. Thus, in this example and for the slow group of slow user interaction instances A-1 and A-4, a first average request response time for URL1 is 1.26 s.

Figure 4:
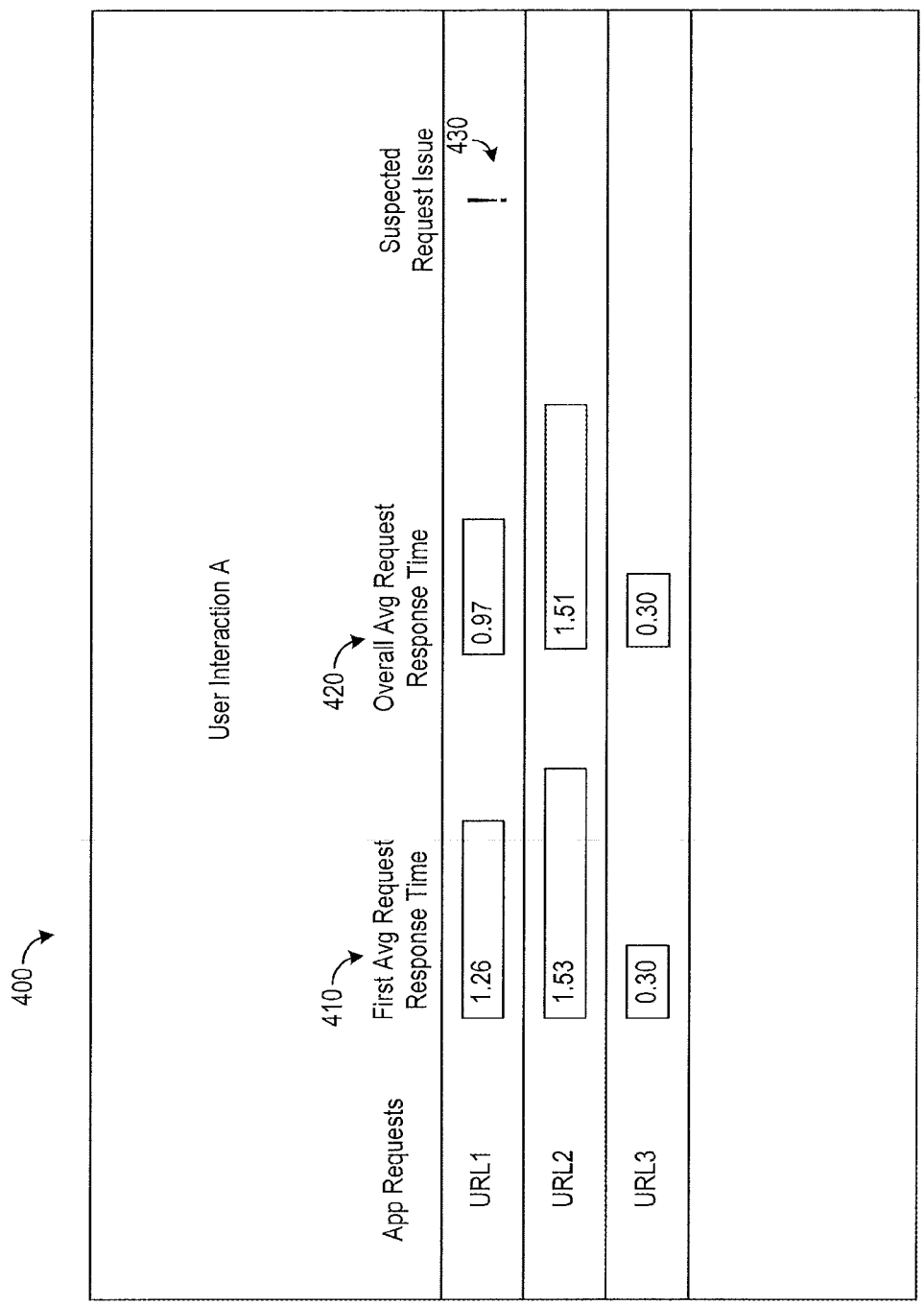
FIG. 4 is an illustration of a display showing representations of first average request response times and comparison request response times according to an example of the present disclosure.

With reference now to FIG. 4, an illustration of an example display 400 showing representations of response times according to the example of FIG. 3 is provided. In the example of FIG. 4, the user interaction instances A-1, A-2, A-3 and A-4, user interaction times, request response times, and slow threshold from the example of FIG. 3 are utilized. As shown in FIG. 4, a representation of a first average request response time 410 for each of the 3 application requests URL1, URL2 and URL3 is displayed. As noted above, in this example the first average request response time 410 for URL1 is 1.26 s. In this example the first average request response times 410 for URL2 and URL 3 are 1.53 s. and 0.30 s, respectively. In some examples, the representation may be a numerical value, a visual indicator of magnitude, a combination of a value and visual indicator, or other suitable representation.

In some examples, a comparison request response time for a selected application request over a plurality of instances of a user interaction may be determined. In some examples, the comparison response time may be an overall average request response time for the selected application request over the plurality of instances of the user interaction with the application. In the examples of FIGS. 3 and 4, for URL1 an overall average request response time may be the average of the 4 request response times for URL1-1, URL1-2, URL1-3 and URL1-4. In this example the overall average request response time for URL1 is 0.97 s. In the example of FIG. 4, a representation of the overall average request response time 420 for each of the 3 application requests is displayed.

By associating each application request with a particular user interaction, and by displaying the first average request response times that each correspond to a slow group of slow interactions and displaying overall average request response times for each application request of this user interaction, a suspected application request issue may be easily identified. In the example of FIG. 4 for example, a user viewing the first average request response times 410 and overall average request response times 420 may quickly determine that application request URL1 has a meaningful difference between such response times. Additionally, the user may quickly determine that application requests URL2 and URL3 do not have meaningful differences between such response times. In other words, a user may quickly see that a magnitude of the difference between 1.26 s. and 0.97 s. for URL1 is significantly greater than the corresponding difference displayed for URL2 and URL3. Accordingly, this information may allow the user to quickly prioritize URL1 for investigation of performance issues.

In some examples, when a difference between the first average request response time and the comparison request response time exceeds a correlation threshold, a request alert indicating an application request issue may be outputted. With reference again to FIG. 4, in this example an example correlation threshold may be a predetermined time period, for example 0.10 s. In this example and for URL1, the difference between the first average request response time of 1.26 s. and the overall average request response time of 0.97 s. is 0.29 s., which exceeds the correlation threshold of 0.10 s. Because the correlation threshold is exceeded, a request alert 430 indicating a suspected application request issue may be displayed. In some examples, the correlation threshold may be received via user input or may be programmatically determined. In some examples, a correlation threshold may be a percentage of the comparison request response time, or may be otherwise determined in relation to the comparison request response time.

Continuing with this example and for URL2, the difference between the first average request response time of 1.53 s. and the overall average request response time of 1.51 s. is 0.02 s., which does not exceed a different example correlation threshold of 0.15 s. for URL2. Because the correlation threshold is not exceeded, a request alert 430 indicating a suspected application request issue is not displayed. In some examples, a correlation threshold may be the same value for different application requests.

In some examples, the comparison response time may be a second average request response time for a selected application request. In some examples, fast instances of user interactions with an application may be selected, where the fast instances have a user interaction time less than or equal to the slow threshold. In the example of FIG. 3, user interaction instances A-2 and A-3 have user interaction times less than or equal to the slow threshold of 2.55 s. Fast user interactions instances A-2 and A-3 may be grouped into a fast group, and the request response times for each of the 3 application requests URL1, URL2 and URL3 may be averaged to generate a second average request response time. For example, instance A-2 includes URL1-2 having a request response time of 0.41 s. Instance A-3 includes URL1-3 having a request response time of 0.93 s. Thus, a second average request response time for URL1 is 0.67 s.

Figure 5:
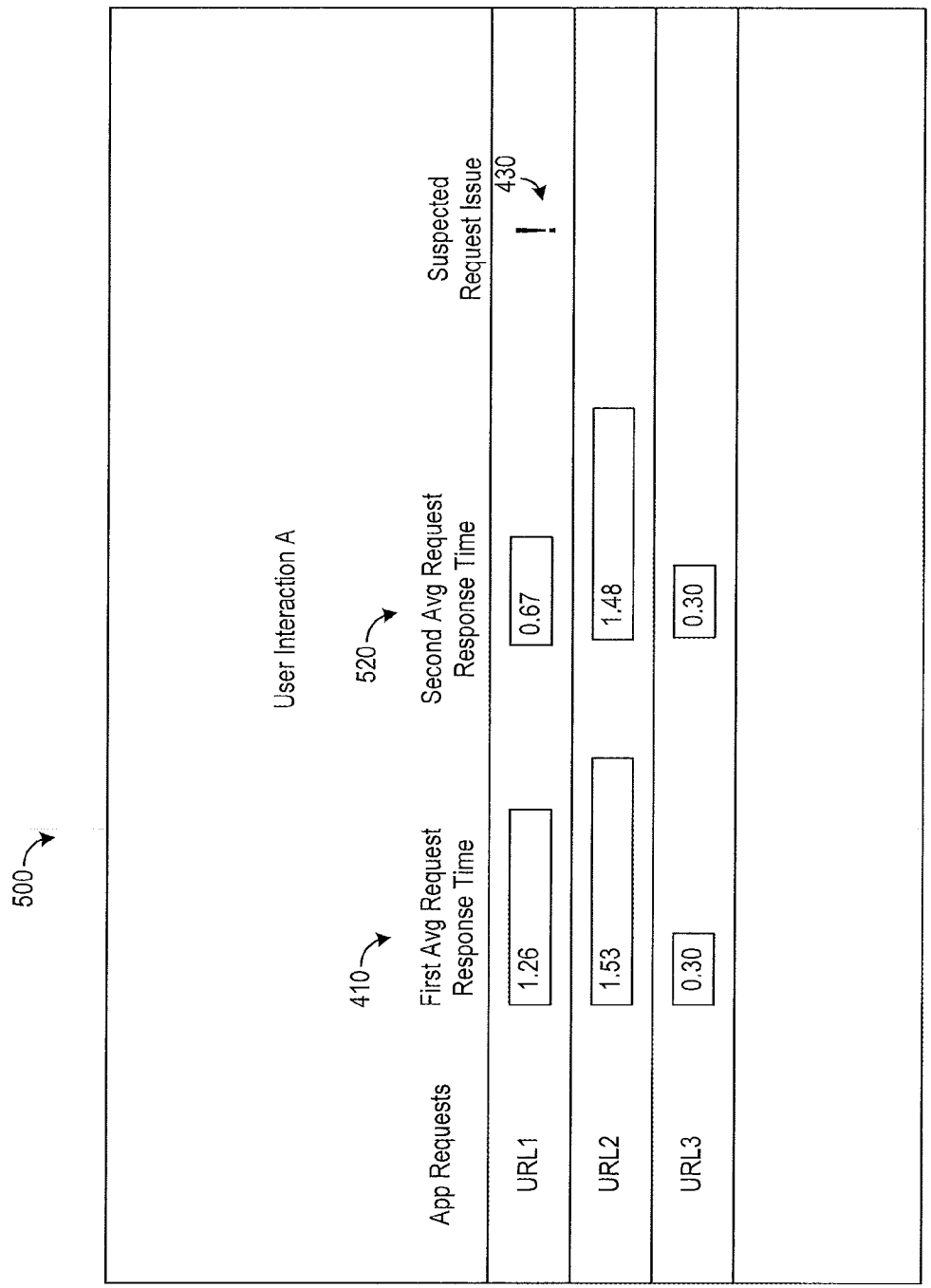
FIG. 5 is an illustration of a display showing representations of first average request response times and comparison request response times according to an example of the present disclosure.

With reference now to the example of FIG. 5, an example illustration of a display 500 showing representations of first average request response times 410 and comparison request response times in the form of second average request response times 520 for each of the 3 application requests according to an example of the present disclosure is provided.

By associating each application request with a particular user interaction, and by displaying the first average request response times and second average request response times for each application request of this user interaction, a suspected application request issue may be easily identified. In the example of FIG. 5 for example, a user viewing the first average request response times 410 and the second average request response times 520 may quickly determine that application request URL1 has a meaningful difference between such response times. Additionally, the user may quickly determine that application requests URL2 and URL3 do not have meaningful differences between such response times. Accordingly, this information may allow the user to quickly prioritize the logic that handles URL1 for investigation of performance issues.

As with the example of FIG. 4, in some examples when a difference between the first average request response time for an application request and the second average request response time for that request exceeds a correlation threshold, a request alert 430 indicating an application request issue may be outputted. In the example of FIG. 5, request alert 430 indicating a suspected issue for application request URL1 may be displayed In some examples, where a difference between the first average request response time and comparison request response time for each of the application requests is within a client threshold, an issue with the client device may be indicated. In some examples, the client threshold may correspond to a substantially negligible difference between the first average request response time and a comparison request response time. In some examples, the client threshold may be the same value or range for each of the application requests. In other examples, a different client threshold may be utilized for different application requests.

Figure 6:
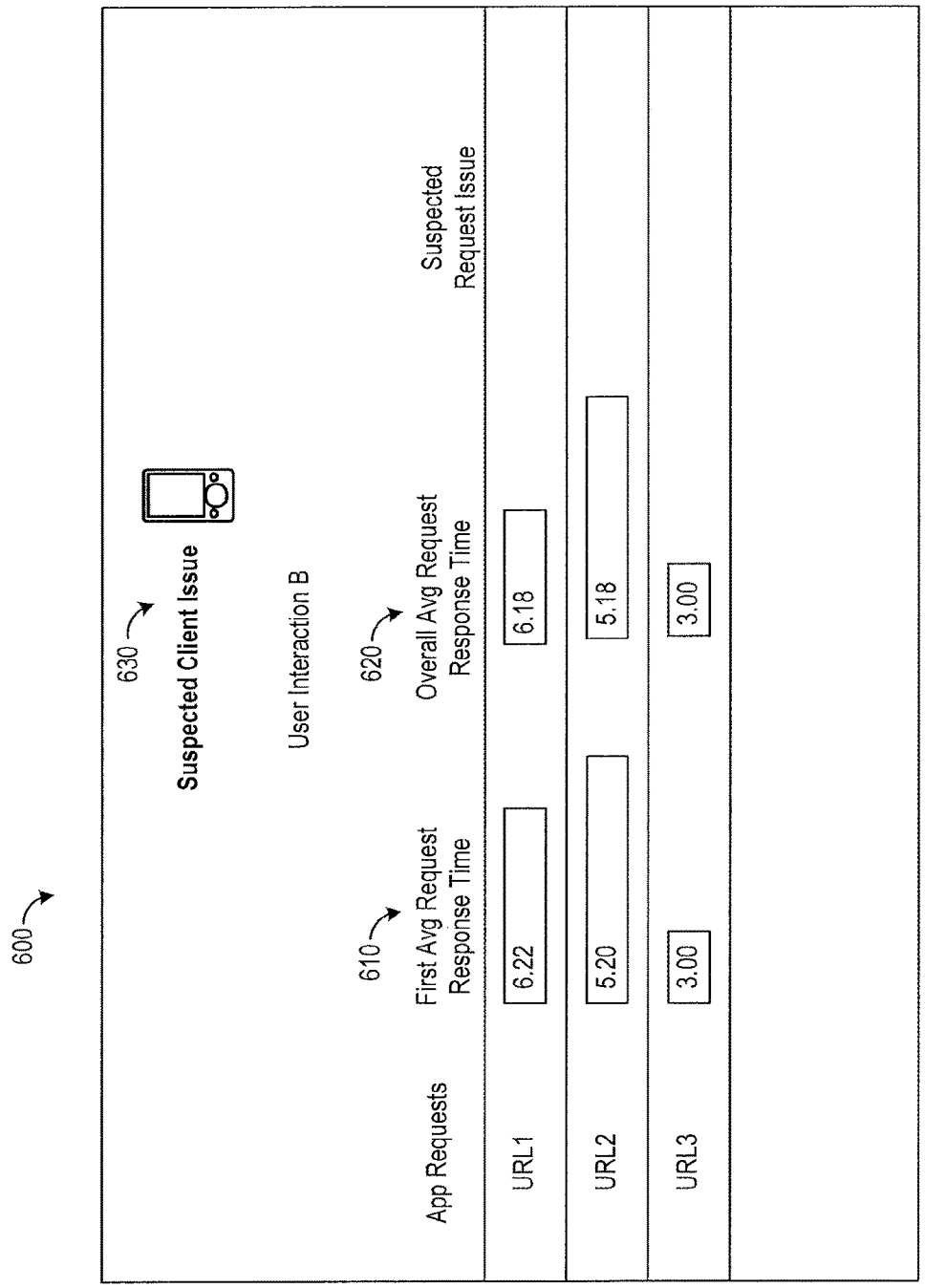
FIG. 6 is an illustration of a display showing representations of first average request response times and comparison request response times according to an example of the present disclosure.

In one example and with reference now to FIG. 6, an illustration of a display 600 showing representations of first average request response times 610 and comparison request response times in the form of overall average request response times 620 for another user interaction B is provided. In this example, a first client threshold for application request URL1 may be a request response time within 1% of the overall average request response time. In this example for URL1, the first average request response time of 6.22 s. is within 1% of the overall average request response time of 6.18 s. In other words, the difference between the first average response time and the overall average response time is less than 1% of the overall average response time.

In this example, a second client threshold for application request URL2 may be a request response time within 2% of the overall average request response time. In this example for URL2, the difference between the first average request response time of 5.20 s. and the overall average request response time of 5.18 s. is less than 2% of the overall average request response time of 5.18 s. In this example, a third client threshold for application request URL3 may be a request response time within 1% of the overall average request response time. In this example for URL3, the first average request response time and the overall average request response time are the same.

In this example, as the difference between the first average request response time and comparison request response time for each of the application requests is within a client threshold, an issue with the client device may be indicated. In response and in some examples, a client alert indicating a suspected client device issue may be outputted. In the example of FIG. 6, an alert 630 may be displayed on display 600 to indicate to the user that a suspected client issue for user interaction B has been identified.

In some examples, the first average request response times and comparison request response times for each of the application requests may be different by a similar amount. In other words, in some examples each of the first average request response times may be slower than its corresponding comparison request response time by a similar amount. In these examples, a suspected network issue may be indicated.

In some examples, the difference between a first average request response time and its corresponding comparison request response time may be referred to as a network threshold difference, and may be expressed as a percentage. In one example and with reference now to FIG. 7, an illustration of a display 700 showing representations of first average request response times 710 and comparison request response times in the form of second average request response times 720 for another user interaction C is provided. In this example, the percentage difference between a first average request response time 710 and a second average request response time 720 for an application request may be compared to a network threshold difference of 15%+/−2%.

In this example for URL1, a percentage difference between the first average request response time of 4.11 s. and the overall average request response time of 3.57 s. is 15.12%, which is within the network threshold difference. For URL2, a difference between the first average request response time of 1.74 s. and the overall average request response time of 1.51 s. is 15.13%, which is also within the network threshold difference. For URL3, a difference between the first average request response time of 0.35 s.

and the overall average request response time of 0.30 s. is 16.67%, which is also within the network threshold difference.

Figure 7:
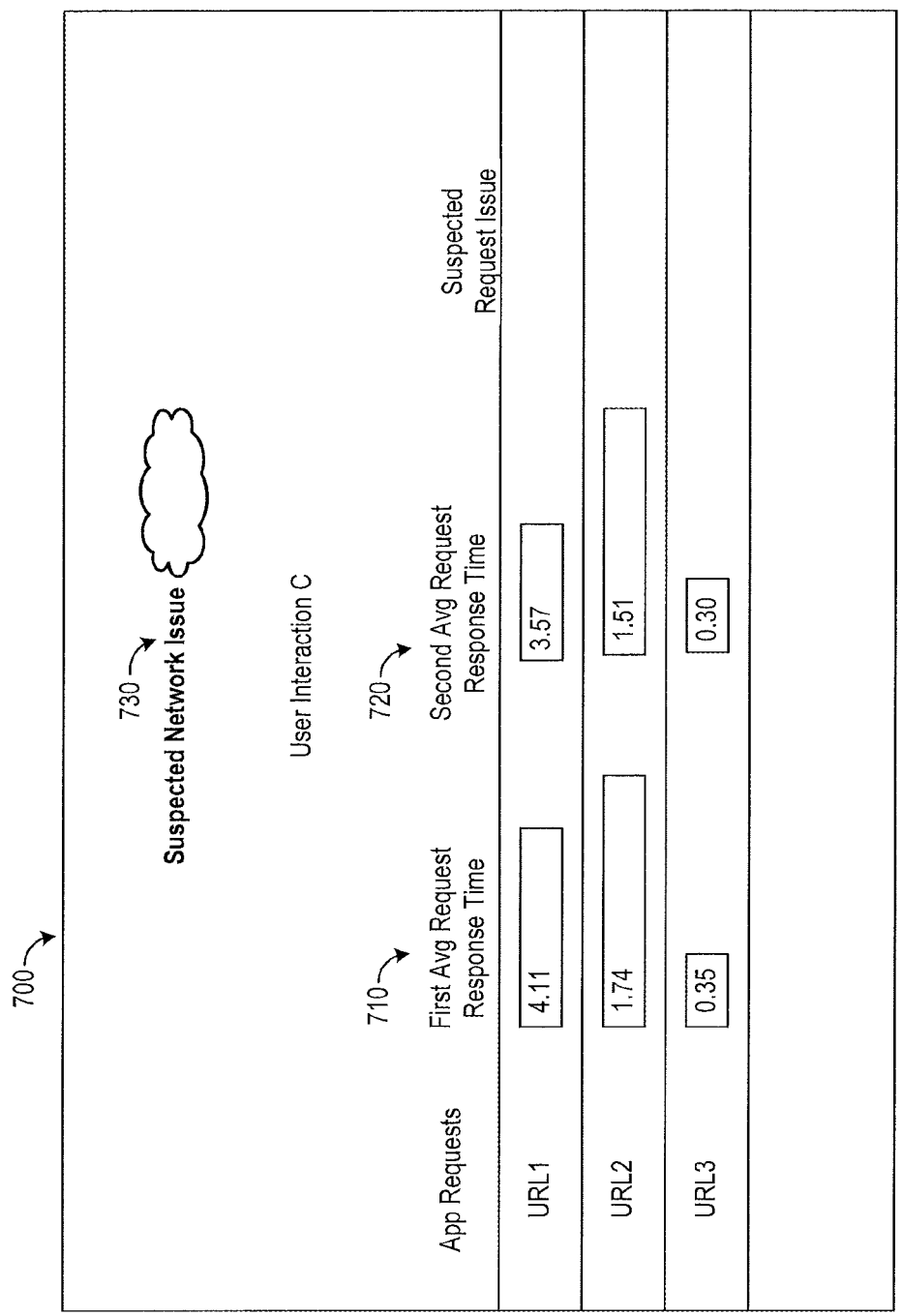
FIG. 7 is an illustration of a display showing representations of first average request response times and comparison request response times according to an example of the present disclosure.

In this example, as the difference between the first average request response time and comparison request response time for each of the application requests is within the network threshold difference, an issue with the network over which the application communicates may be indicated. In response and in some examples, a client alert indicating a suspected network issue may be outputted. In the example of FIG. 7, an alert 730 may be displayed on display 700 to indicate to the user that a suspected network issue for user interaction C has been identified.

In some examples, an amount of variation of the user interaction times among a plurality of user interaction instances of a user interaction may be determined. Using the amount a variation, a plurality of temporal groupings may be created, and each of the user interaction instances may be matched with one of the temporal groupings based on its user interaction time. For each of the temporal groupings, an average operation time for a selected application operation may then be determined.

Figure 8:
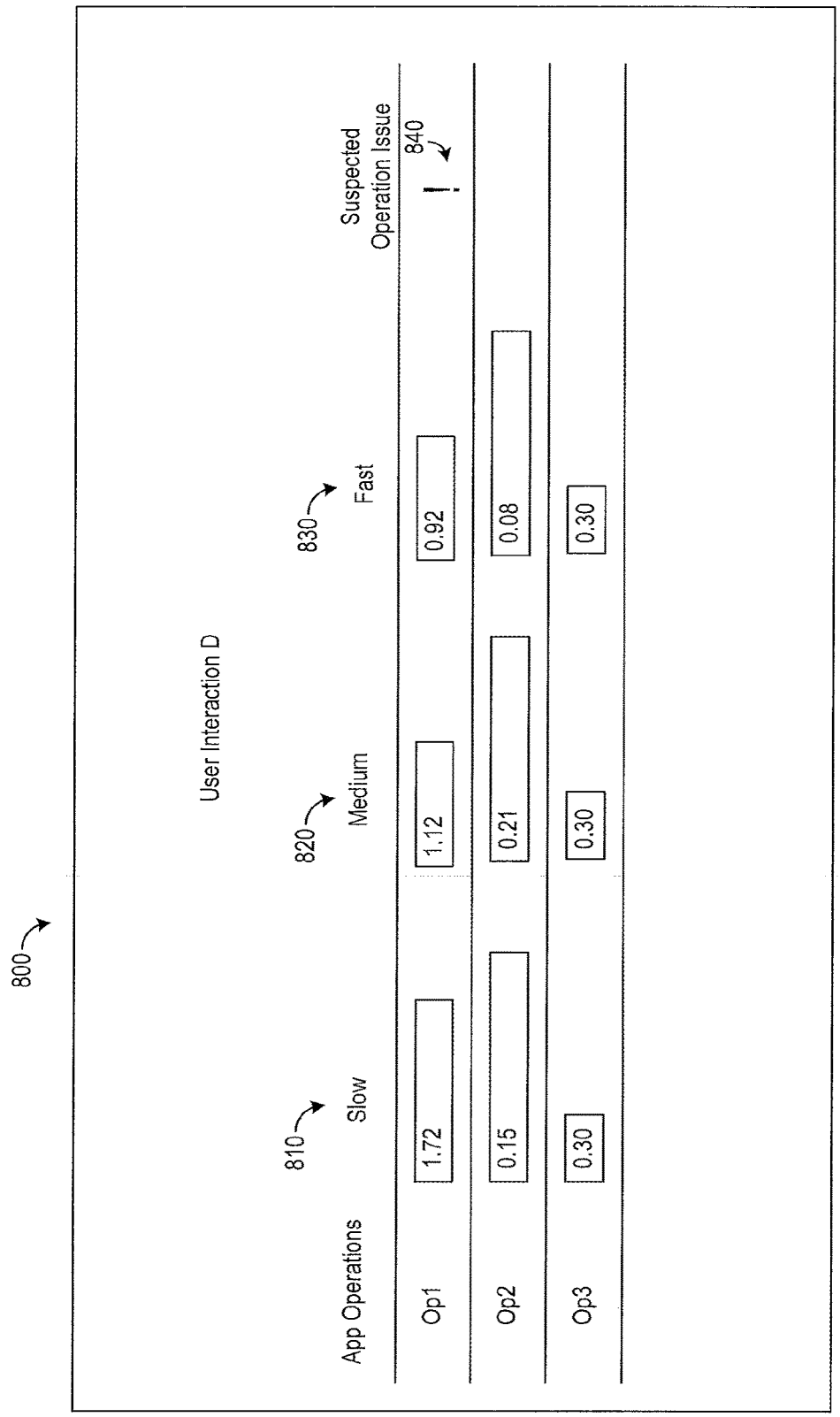
FIG. 8 is an illustration of a display showing representations of average request response times for temporal groupings according to an example of the present disclosure.

With reference now to FIG. 8, an example of user interaction instances, user interaction times and operation times for a user interaction is provided. In this example, an illustration of a display 800 showing representations of a slow temporal grouping 810, medium temporal grouping 820 and fast temporal grouping 830 for user interaction A is provided. In this example, 8 instances of another user interaction D have been received, and may be referred to as user interaction instances D-1 through D-8. In this example, user interaction D includes 3 application operations 40 that are denoted Op1, Op2 and Op3. In other examples, user interactions may include fewer or more application operations.

For each of the 8 instances of user interaction D, an operation time for each of the 3 application operations may be determined. For each of the 8 instances, a user interaction time may be obtained. The user interaction time may be the sum of the 3 operation times for the user interaction.

In some examples, to determine an amount of variation of the user interaction times among the user interaction instances, a standard deviation of the user interaction times may be determined. In other examples, other methods and techniques for determining an amount of variation among a plurality of values may be utilized.

In some examples, an overall average of the user interaction times of the 8 instances D-1 through D-8 of user interaction D may be determined. In the example of FIG. 8, the overall average user interaction time of the 8 instances may be 2.10 s. A variance of the user interaction times of the 8 instances may then be determined. In the example of FIG. 8, a variance of the 8 instances may be 0.28 s. Using this variance, a standard deviation of the user interaction times among the 8 instances may be determined. In the example of FIG. 8, the standard deviation among the 8 instances may be 0.53 s.

In some examples, a plurality of temporal groupings may be created using the standard deviation. In some examples, the plurality of temporal groupings may be created using the standard deviation and the average user interaction time of the 8 instances. In the example of FIG. 8, the 3 temporal groupings 810, 820 and 830 may be created using the standard deviation and the average user interaction time of the 8 instances of user interaction D.

More particularly, the slow temporal grouping 810 may contain those user interaction instances that have a user interaction time greater than or equal to a slow value, where the slow value is the overall average user interaction time of the 8 instances plus the standard deviation. In the example of FIG. 8, the slow value is equal to the overall average user interaction time of the 8 instances plus a standard deviation of the user interaction times among the 8 instances, for example 2.10+0.53=2.63 s. In the example of FIG. 8, user interaction instances D-4 and DA-7 have user interaction times greater than or equal to 2.63 s., and are therefore placed in the slow temporal grouping 810.

Within the slow temporal grouping 810, the operation times for each of the 3 application operations Op1, Op2 and Op3 may be averaged to generate a first average operation time. For example, instance D-4 may include Op1-4 having an operation time of 1.62 s. Instance D-7 may include Op1-7 having a time of 1.82 s. Thus, a first average operation time for Op1 is 1.72 s. In this example, a first average operation time for Op 2 is 0.15 and for Op 3 is 0.30.

The medium temporal grouping 820 may contain those user interaction instances that have a user interaction time within a medium value range, where the medium value range contains those user interaction times less than the overall average of the 8 instances plus the standard deviation and greater than the overall average of the 8 instances minus the standard deviation. In the example of FIG. 8, the medium value range is 2.63>user interaction time >1.57, where the user interaction time is a user interaction time for a selected user interaction instance. In the example of FIG. 8, user interaction instances D-1, D-2, D-3 and D-6 have user interaction times within the medium value range of 2.63>operation time>1.57, and are therefore placed in the medium temporal grouping 820.

Within the medium temporal grouping 820, the operation times for each of the 3 application operations Op1, Op2 and Op3 may be averaged to generate a second average operation time. For example, instances D-1, D-2, D-3 and D-6 may include an Op1 having an operation time of 1.10 s., 0.92 s., 1.24 s. and 1.20 s., respectively. Thus, a second average operation time for Op1 is 1.12 s. In this example, a second average operation time for Op2 is 0.21 s and for Op3 is 0.30 s.

The fast temporal grouping 830 may contain those user interaction instances that have a user interaction time less than or equal to a fast value, where the fast value is the overall average of the 8 instances minus the standard deviation. In the example of FIG. 8, the fast value is 2.10–0.53=1.57 s. In the example of FIG. 8, user interaction instances D-5 and D-8 have user interaction times less than or equal to 1.57 s., and are therefore placed in the fast temporal grouping 830.

Within the fast temporal grouping 830, the operation times for each of the 3 application operations Op1, Op2 and Op3 may be averaged to generate a third average operation time. For example, instance D-5 may include Op1-5 having an operation time of 1.12 s. Instance D-8 may include Op1-8 having an operation time of 0.72 s. Thus, a third average time for Op1 is 0.92 s. In this example, a third average operation time for Op2 is 0.08 s and for Op3 is 0.30 s.

By associating each application operation with a particular user interaction, and by displaying a first average operation time, second average operation time and third average operation time for each application operation of this user interaction, a suspected application operation issue may be easily identified. In the example of FIG. 8 for example, a user viewing the first average operation times under the slow grouping 810, second average operation times 820 under the medium grouping 820 and third average operation times 830 under the fast grouping 830 may quickly determine that these response times for application operation Op1 continually decrease across the 3 temporal groupings, from slow to fast. Such continual decrease may indicate a suspected application operation issue with Op1. Additionally, the user may quickly determine that the operation times for application operations OpL2 and Op3 do not continually decrease across the temporal groups. Accordingly, this information may allow the user to quickly prioritize Op1 for investigation of performance issues.

In another example, the 3 temporal groupings may be displayed in a reverse order from fast to slow. In this example, a user may quickly determine that the response times for application operation Op1 continually increase across the 3 temporal groupings, from fast to slow. Such continual increase may indicate a suspected application operation issue with Op1. Additionally, the user may quickly determine that the operation times for application operations Op2 and Op3 do not continually increase across the temporal groups. Accordingly, this information may allow the user to quickly prioritize Op1 for investigation of performance issues.

In some examples, when the response times for an application operation continually increase or decrease across the temporal groupings, an operation alert indicating an application operation issue may be outputted. With reference again to FIG. 8, in this example and for Op1, an operation alert 840 indicating a suspected application operation issue may be displayed.

In other examples, fewer or more temporal groupings may be utilized.

Figure 9:
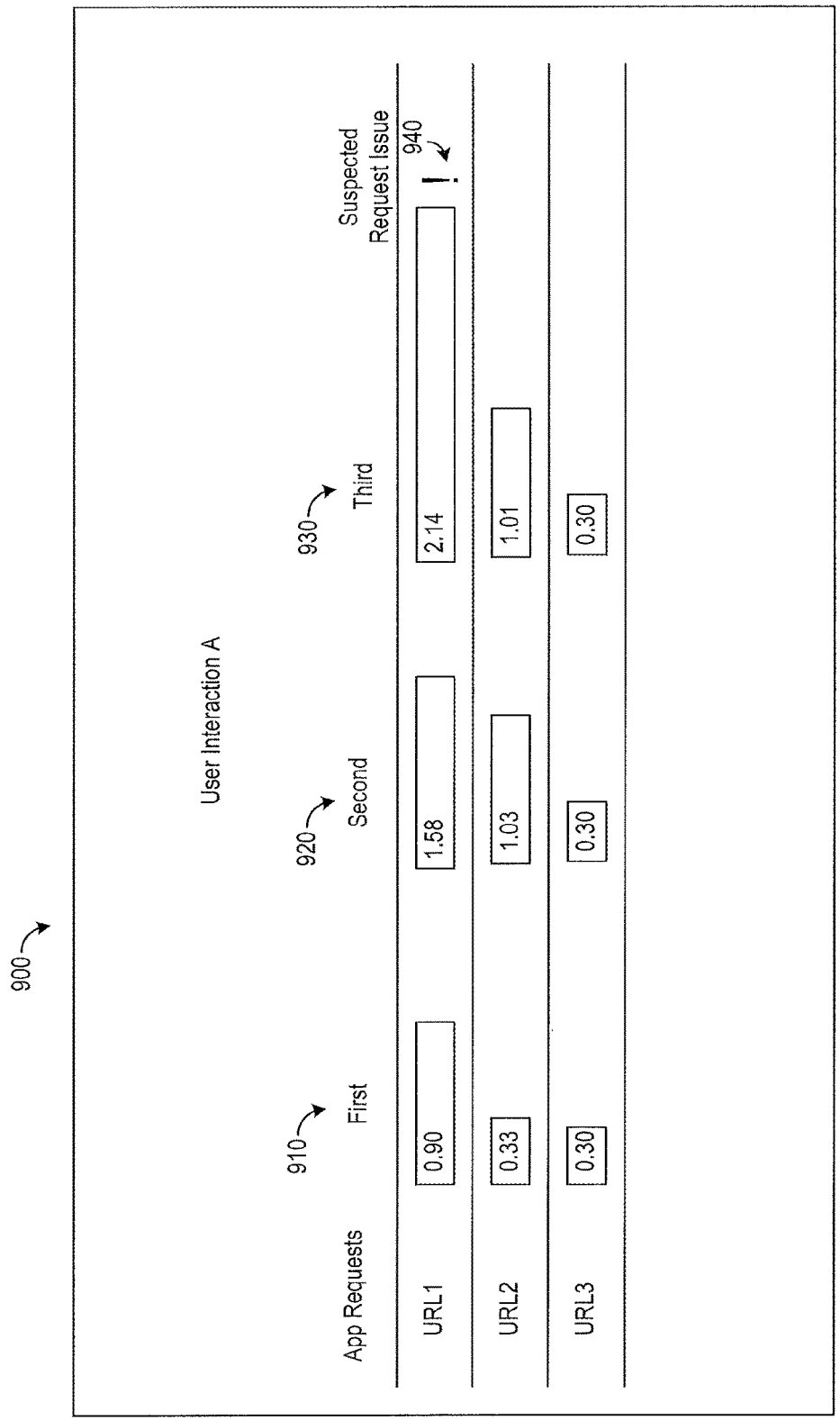
FIG. 9 is an illustration of a display showing representations of average request response times for temporal groupings according to an example of the present disclosure.

In some examples and with reference to FIG. 9, a plurality of temporal groupings may be created utilizing a constant value and a multiplier. Each of the user interaction instances may be matched with one of the temporal groupings based on its user interaction time. For each of the temporal groupings, an average operation time for a selected application operation may then be determined.

In the example of FIG. 9, an illustration of a display 900 showing representations of a first temporal grouping 910, second temporal grouping 920, and third temporal grouping 930 for user interaction A is provided. In this example, 8 instances of user interaction A have been received, and may be referred to as user interaction instances A-1 through A-8. The user interaction A includes 3 application requests 42 to URL1, URL2 and URL3. In other examples, user interactions may include fewer or more application requests.

Each temporal grouping may contain those user interaction instances that have a user interaction time within a range based on a constant value V. In some examples, a temporal grouping may contain those user interaction instances that have a user interaction time within a range based on a constant value V multiplied by a multiplier M. In some examples, the multiplier M may be incremented or decremented for each successive temporal grouping.

In one example and with reference to FIG. 9, the first temporal grouping 910 may contain those user interaction instances that have a user interaction time within a first range that is less than the product of constant value V and multiplier M, or V*M. In one example, the constant value V may be 1.00 and the multiplier M may be 1.00. Thus, in this example the first range may be expressed as user interaction time<1.00. In other examples, different values for the constant value V and the multiplier M may be utilized.

The second temporal grouping 920 may contain those user interaction instances that have a user interaction time within a second range, where the second range contains those user interaction times that are greater than or equal to V*M and less than or equal to V*(M+1). In other words, the second range may be expressed as V*M≤user interaction time≤V*(M+1)). In the example of FIG. 9, the second range may be expressed as 1.00≤user interaction time≤2.00. In this example, the multiplier M for the second temporal grouping has been incremented by 1.

The third temporal grouping may contain those user interaction instances that have a user interaction time within a third range, where the third range contains those user interaction times that are greater than V*(M+1) and less than V*(M+2). In other words, the third range may be expressed as V*(M+1)<user interaction time<V*(M+2)). In the example of FIG. 9, the third range may be expressed as 2.00<user interaction time<3.00. In this example, the multiplier M for the third temporal grouping has been incremented by 2.

In one example, user interaction instances A-5 and A-7 may have user interaction times within the first temporal grouping 910. For each instance A-5 and A-7, the request response times for each of the 3 application requests URL1, URL2 and URL3 may be averaged to generate a first average request response time. For example, instance A-5 may include URL1-5 having a request response time of 1.10 s. Instance A-7 may include URL1-7 having a request response time of 0.70 s. Thus, a first average request response time for URL1 is 0.90 s. In this example, a first average request response time for URL2 is 0.33 s. and for URL3 is 0.30 s.

In this example, user interaction instances A-1, A-2 and A-8 may have user interaction times within the second temporal grouping 920. For each instance A-1, A-2 and A-8, the request response times for each of the 3 application requests URL1, URL2 and URL3 may be averaged to generate a second average request response time. For example, a second average request response time for URL1 is 1.58 s., for URL2 is 1.03 s., and for URL3 is 0.30 s.

In this example, user interaction instances A-3, A-4 and A-6 may have user interaction times within the third temporal grouping 930. For each instance A-3, A-4 and A-6, the request response times for each of the 3 application requests URL1, URL2 and URL3 may be averaged to generate a third average request response time. For example, a third average request response time for URL1 is 2.14 s, for URL2 is 1.01 s, and for URL3 is 0.30 s.

By associating each application request with a particular user interaction, and by displaying a first average request response time, second average request response time and third average request response time for each application request of this user interaction, a suspected application request issue may be easily identified. In the example of FIG. 9 for example, a user viewing the first average request response times under the first grouping 910, second average request response times under the second grouping 920 and third average request response times under the third grouping 930 may quickly determine that these response times for application request URL1 continually increase across the 3 temporal groupings, from fast to slow. Such continual increase may indicate a suspected application request issue with URL1. A request alert 940 indicating a suspected application request issue may be displayed for URL1. Additionally, the user may quickly determine that the request response times for application requests URL2 and URL3 do not continually increase across the temporal groups. Accordingly, this information may allow the user to quickly prioritize URL1 for investigation of performance issues.

In other examples, fewer or more temporal groupings and corresponding ranges may be utilized. For example, additional slower temporal groupings, such as V*(M+2)≤user interaction time≤V*(M+3)), V*(M+3)<user interaction time<V*(M+4)), etc., may be utilized. In some examples, additional faster temporal groupings may be utilized.

The examples shown in FIGS. 3-9 and described above are provided as examples, and many variations are possible in the user interaction instances, user interaction times, application request response times, temporal groupings, and the like.

Figure 10B:
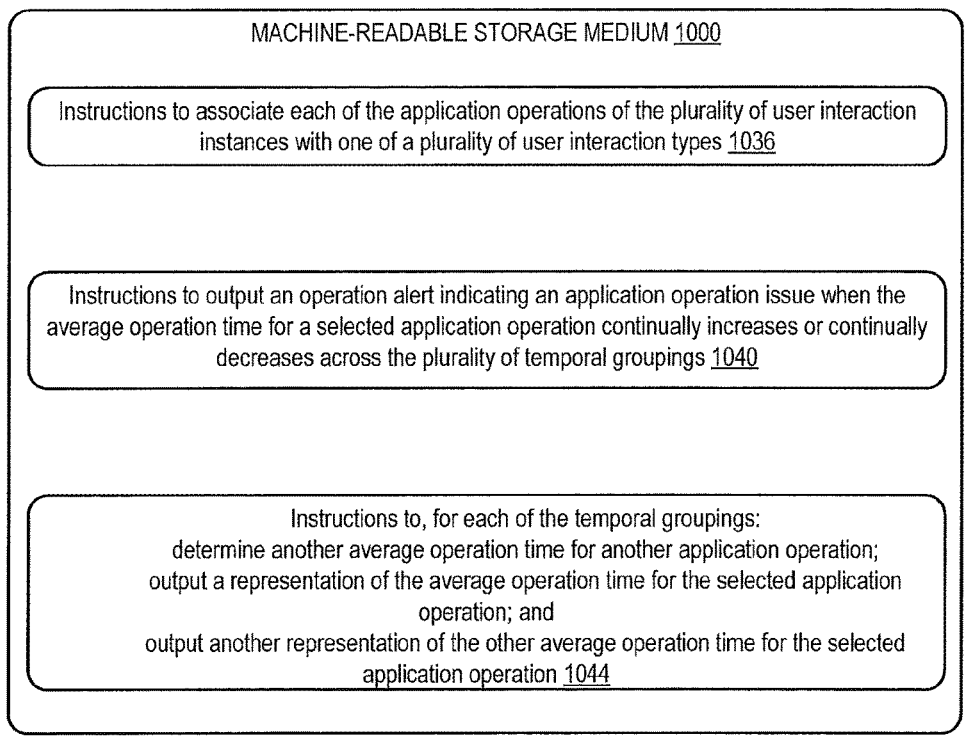

With reference now to FIGS. 10A and 10B, a block diagram of a non-transitory machine-readable storage medium 1000 containing instructions according to an example of the present disclosure is provided. In some examples, the non-transitory machine-readable storage medium may comprise instructions for user interactions with an application. When executed by at least one processor, such as processor 20 of the system 10, such instructions may determine an average operation time for a selected application operation in a manner consistent with the following example and other examples described herein.

In the example of FIGS. 10A and 10B, and as described in more detail below, the instructions of non-transitory machine-readable storage medium 1000 may include instructions to, at 1004, monitor a plurality of instances of a user interaction with an application, the user interaction comprising a plurality of application operations that each have an operation time. At 1008 the plurality of application operations may be asynchronous requests. At 1012 the instructions may obtain a user interaction time for each of the user interaction instances. At 1016 the instructions may determine an amount of variation of the user interaction times among the user interaction instances. At 1020 the amount of variation may be a standard deviation of the plurality of operation times.

At 1024 the instructions may create a plurality of temporal groupings based on the amount of variation. At 1028 the instructions may match each of the user interaction instances with one of the temporal groupings based on the user interaction time of the user interaction instance. At 1032 the instructions may, for each of the temporal groupings, determine an average operation time for a selected application operation.

With reference now to FIG. 10B, at 1036 the instructions may associate each of the application operations of the plurality of user interaction instances with one of a plurality of user interaction types. At 1040 the instructions may output an operation alert indicating an application operation issue when the average operation time for a selected application operation continually increases or continually decreases across the plurality of temporal groupings. At 1044 the instructions may, for each of the temporal groupings: determine another average operation time for another application operation; output a representation of the average operation time for the selected application operation; and output a representation of the other average operation time for the selected application request.

Figure 11A:
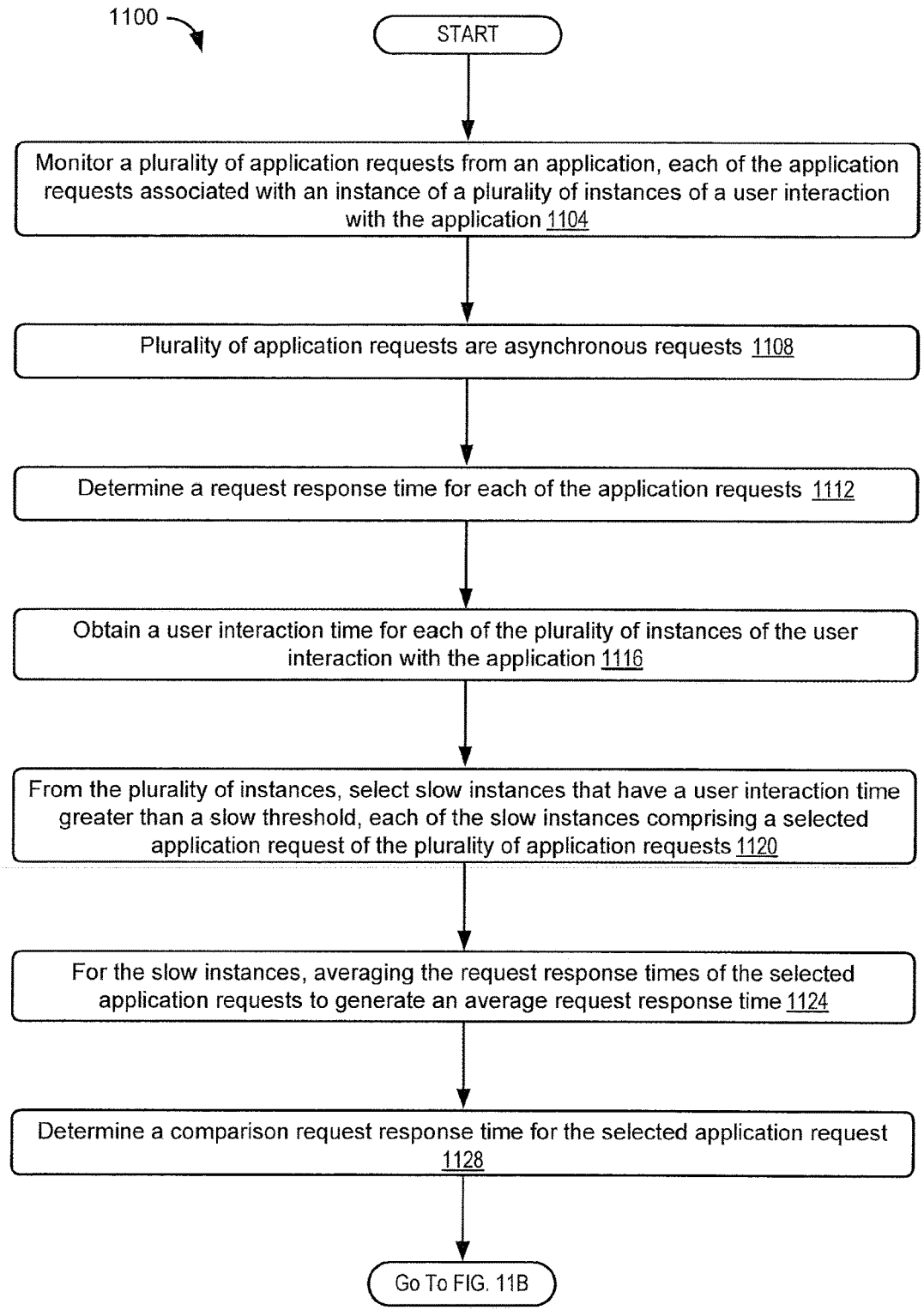
FIGS. 11A, 11B and 11C are a flow chart of a method for application requests according to an example of the present disclosure.
Figure 11B:
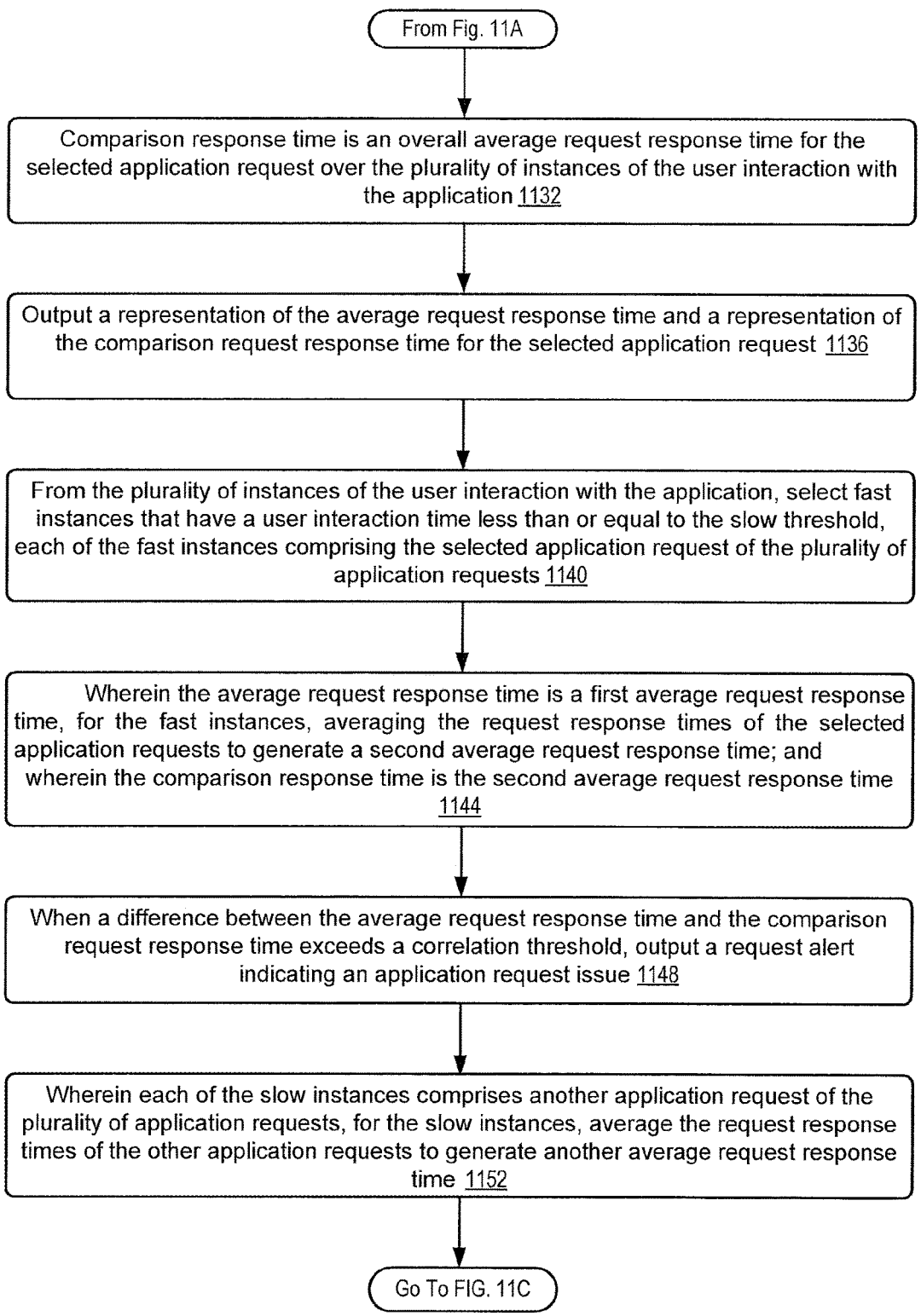
Figure 11C:
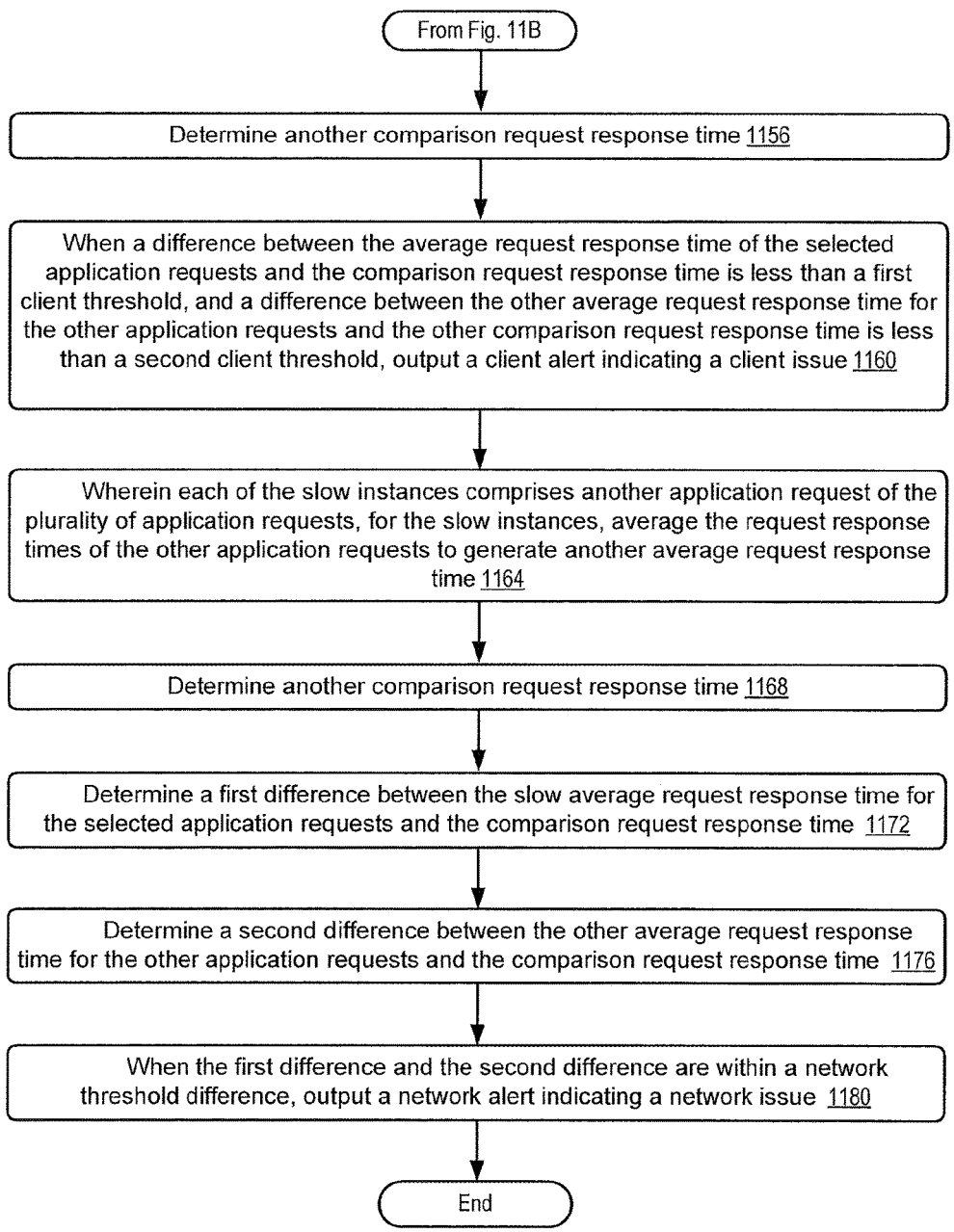

Turning now to FIGS. 11A-11C, a flow chart of a method 1100 for application user interaction according to another example of the present disclosure is provided. The following description of method 1100 is provided with reference to the instructions (e.g. software) and hardware components described above and shown in FIGS. 1-10. The method 1100 may be executed in the form of instructions encoded on a non-transitory machine-readable storage medium that is executable by a processor. It will be appreciated that method 1100 may also be performed in other contexts using other suitable hardware and instructions (e.g. software) components.

With reference to FIG. 11A, at 1104 the method 1100 may include monitoring a plurality of application requests from an application, each of the application requests associated with an instance of a plurality of instances of a user interaction with the application. At 1108 the plurality of application requests may be asynchronous requests. At 1112 the method 1100 may include determining a request response time for each of the application requests. At 1116 the method 1100 may include obtaining a user interaction time for each of the plurality of instances of the user interaction with the application.

At 1120 the method 1100 may include, from the plurality of instances, selecting slow instances that have a user interaction time greater than a slow threshold, each of the slow instances comprising a selected application request of the plurality of application requests. At 1124 the method 1100 may include, for the slow instances, averaging the request response times of the selected application requests to generate an average request response time. At 1128 the method 1100 may include determining a comparison request response time for the selected application request.

With reference now to FIG. 11B, at 1132 the comparison response time may be an overall average request response time for the selected application request over the plurality of instances of the user interaction with the application. At 1136 the method 1100 may include outputting a representation of the average request response time and a representation of the comparison request response time for the selected application request. At 1140 the method 1100 may include, from the plurality of instances of the user interaction with the application, selecting fast instances that have a user interaction time less than or equal to the slow threshold, each of the fast instances comprising the selected application request of the plurality of application requests. At 1144 the method 1100 may include, wherein the average request response time is a first average request response time, for the fast instances, averaging the request response times of the selected application requests to generate a second average request response time, and wherein the comparison response time is the second average request response time.

At 1148 the method 1100 may include, when a difference between the average request response time and the comparison request response time exceeds a correlation threshold, outputting a request alert indicating an application request issue. At 1152 the method 1100 may include, wherein each of the slow instances comprises another application request of the plurality of application requests, for the slow instances, averaging the request response times of the other application requests to generate another average request response time.

With reference now to FIG. 11C, at 1156 the method 1100 may include determining another comparison request response time. At 1160 the method 1100 may include, when a difference between the average request response time of the selected application requests and the comparison request response time is less than a first client threshold, and a difference between the other average request response time for the other application requests and the other comparison request response time is less than a second client threshold, outputting a client alert indicating a client issue.

At 1164 the method 1100 may include wherein each of the slow instances comprises another application request of the plurality of application requests, for the slow instances, averaging the request response times of the other application requests to generate another average request response time. At 1168 the method 1100 may include determining another comparison request response time. At 1172 the method 1100 may include determining a first difference between the average request response time for the selected application requests and the comparison request response time. At 1176 the method 1100 may include determining a second difference between the other average request response time for the other application requests and the other comparison request response time. At 1180 the method 1100 may include, when the first difference and the second difference are within a network threshold difference, outputting a network alert indicating a network issue.

It will be appreciated that method 1100 is provided by way of example and is not meant to be limiting. Therefore, it is to be understood that method 1100 may include additional and/or other elements than those illustrated in FIGS. 11A, 11B and 11C. Further, it is to be understood that method 1100 may be performed in any suitable order. Further still, it is to be understood that at least one element may be omitted from method 1100 without departing from the scope of this disclosure.

Figure 12:
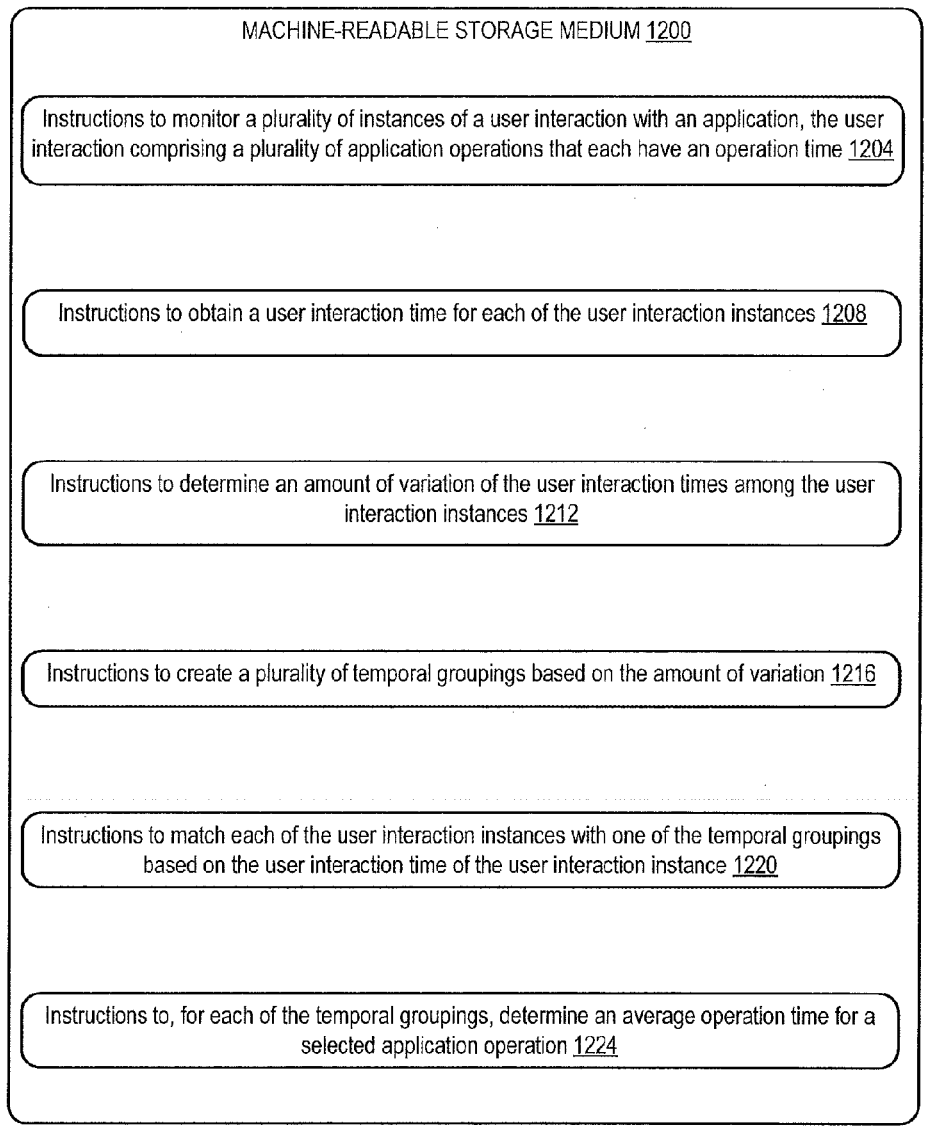
FIG. 12 is a block diagram of a non-transitory machine-readable storage medium containing instructions according to an example of the present disclosure.

With reference now to FIG. 12, a block diagram of a non-transitory machine-readable storage medium 1200 containing instructions according to an example of the present disclosure is provided. In some examples, the non-transitory machine-readable storage medium may comprise instructions for user interactions with an application. When executed by at least one processor, such as processor 20 of the system 10, such instructions may determine an average operation time for a selected application operation in a manner consistent with the following example and other examples described herein.

In the example of FIG. 12 and as described in more detail below, the instructions of non-transitory machine-readable storage medium 1200 may include instructions to, at 1204, monitor a plurality of instances of a user interaction with an application, the user interaction comprising a plurality of application operations that each have an operation time. At 1208 the instructions may obtain a user interaction time for each of the user interaction instances. At 1212 the instructions may determine an amount of variation of the user interaction times among the user interaction instances. At 1216 the instructions may create a plurality of temporal groupings based on the amount of variation. At 1220 the instructions may match each of the user interaction instances with one of the temporal groupings based on the user interaction time of the user interaction instance. At 1224 the instructions may, for each of the temporal groupings, determine an average operation time for a selected application operation.

Figure 13:
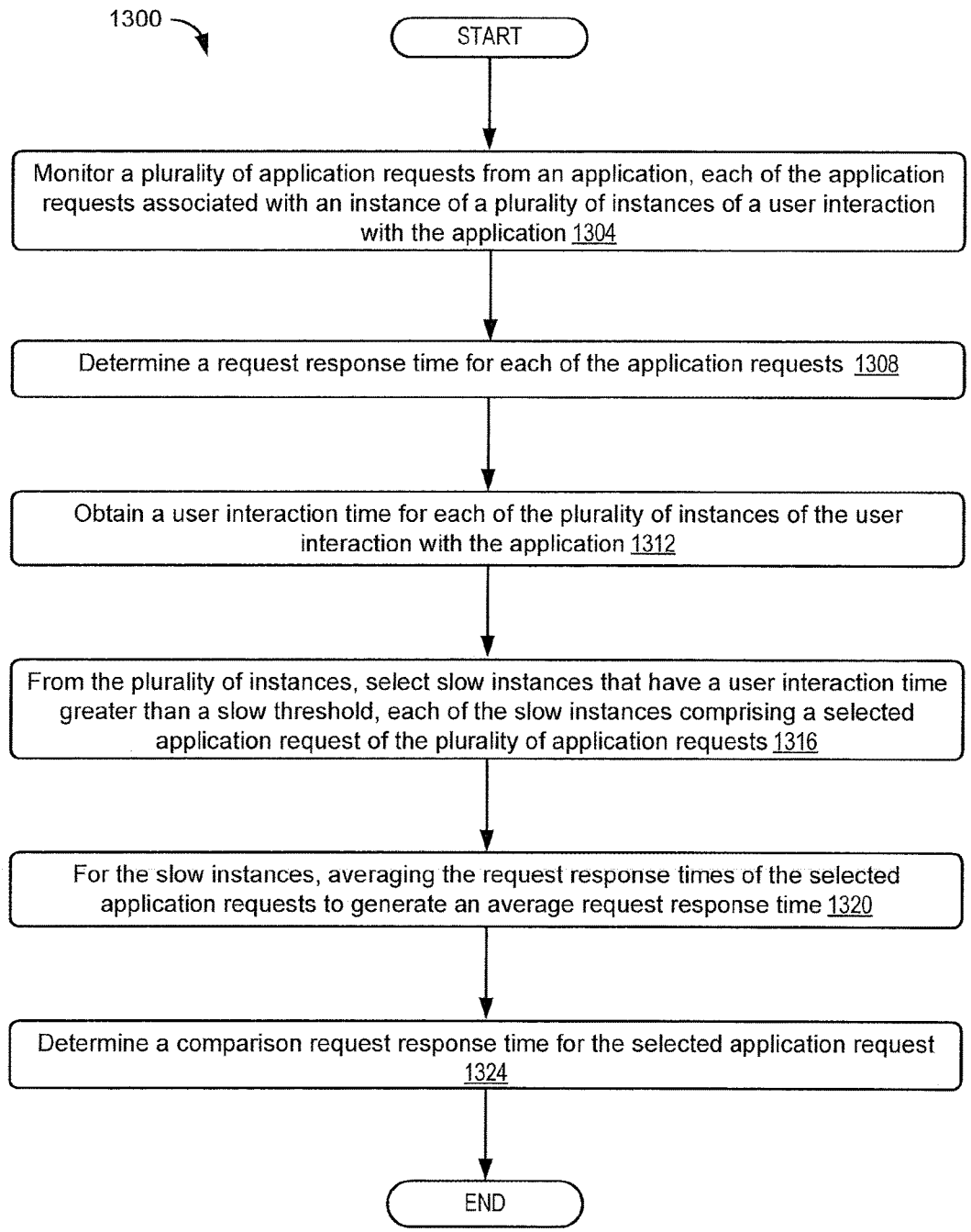
FIG. 13 is a flow chart of a method for application requests according to an example of the present disclosure.

FIG. 13 is a flow chart of a method 1300 for application user interaction according to another example of the present disclosure. The following description of method 1300 is provided with reference to the instructions (e.g. software) and hardware components described above and shown in FIGS. 1-12. The method 1300 may be executed in the form of instructions encoded on a non-transitory machine-readable storage medium that is executable by a processor. It will be appreciated that method 1300 may also be performed in other contexts using other suitable hardware and instructions (e.g. software) components.

At 1304 the method 1300 may include monitoring a plurality of application requests from an application, each of the application requests associated with an instance of a plurality of instances of a user interaction with the application. At 1308 the method 1300 may include determining a request response time for each of the application requests. At 1312 the method 1300 may include obtaining a user interaction time for each of the plurality of instances of the user interaction with the application. At 1316 the method 1300 may include, from the plurality of instances, selecting slow instances that have a user interaction time greater than a slow threshold, each of the slow instances comprising a selected application request of the plurality of application requests. At 1320 the method 1300 may include, for the slow instances, averaging the request response times of the selected application requests to generate an average request response time. At 1324 the method 1300 may include determining a comparison request response time for the selected application request.

FIG. 14 shows a block diagram of a computing system 1400 for user interactions with an application according to an example of the present disclosure. The system 1400 includes a processor 20 that is communicatively coupled to a communication component 50. The communication component 50 receives a plurality of application requests 42 from an application 30, with the processor 20 to: monitor via the plurality of application requests a plurality of instances of a user interaction 1410 with the application 30; obtain a user interaction time 1420 for each of the plurality of user interaction instances; create a plurality of temporal groupings 1430 that each comprise a time range 1440 based on a constant value 1450 and a multiplier 1460; match each of the user interaction instances with one of the temporal groupings 1430 using the user interaction time 1420 of the user interaction instance; and for each of the temporal groupings 1430: determine an average request response time 1470 for a selected application request 42; and output a representation 1480 of the average request response time 1470.

The invention claimed is:

1. A non-transitory machine-readable storage medium encoded with instructions executable by a processor, the machine-readable storage medium comprising:
   instructions to monitor a plurality of user interaction instances, wherein each of the user interaction instances is a different instance of a first user interaction with an application, the first user interaction comprising a first application operation and a second application operation that each have an operation time;
   instructions to determine, for each of the user interaction instances, the operation times of the first and second application operations;
   instructions to obtain a user interaction time for each of the user interaction instances, the user interaction time including the operation times of the first and second application operations;
   instructions to determine an amount of variation of the user interaction times among the user interaction instances;
   instructions to create a plurality of temporal groupings based on the amount of variation, wherein each of the temporal groupings is to include a different subset of the user interaction instances;
   instructions to allocate each of the user interaction instances to one of the temporal groupings based on the user interaction time; and
   instructions to, for each of the temporal groupings, determine an average operation time for the first application operation of the first user interaction.

2. The non-transitory machine-readable storage medium of claim 1, wherein the amount of variation is a standard deviation of the operation times of the first and second application operations.

3. The non-transitory machine-readable storage medium of claim 1, wherein the first and second application operations are asynchronous operations included in the first user interaction.

4. The non-transitory machine-readable storage medium of claim 1, wherein the first application operation is a HyperText Transfer Protocol (HTTP) request to a first Uniform Resource Locator (URL). of user interaction types.

5. The non-transitory machine-readable storage medium of claim 1, comprising instructions to output an operation alert indicating an application operation issue when the average operation time for the first application operation continually increases or continually decreases across the plurality of temporal groupings.

6. The non-transitory machine-readable storage medium of claim 1, comprising instructions to, for each of the temporal groupings:
determine an average operation time for the second application operation of the first user interaction; and
output concurrently:
a representation of the average operation time for the first application operation of the first user interaction; and
a representation of the average operation time for the second application operation of the first user interaction.

7. A method, comprising:
by a processor:
monitoring a plurality of user interaction instances, wherein each of the user interaction instances is a different instance of a first user interaction with an application, the first user interaction comprising a first application request and a second application request;
determining a request response time for each of the first and second application requests of the first user interaction;
obtaining a user interaction time for each of the plurality of user interaction instances of the first user interaction with the application;
from the plurality of user interaction instances, selecting slow user interaction instances that have a user interaction time greater than a slow threshold, each of the slow user interaction instances comprising the first and second application requests;
for the slow user interaction instances, averaging the request response times of the first application requests to generate a first average request response time for the first application request of the first user interaction; and
determining a first comparison request response time for the first application request of the first user interaction.

8. The method of claim 7, comprising outputting a representation of the first average request response time and a representation of the first comparison request response time for the first application request.

9. The method of claim 7, wherein the first comparison request response time is an overall average request response time for the first application request over the plurality of user interaction instances of the first user interaction with the application.

10. The method of claim 7, comprising:
from the plurality of user interaction instances of the first user interaction with the application, selecting fast user interaction instances that have a user interaction time less than or equal to the slow threshold, each of the fast user interaction instances comprising the first and second application requests; and
for the fast user interaction instances, averaging the request response times of the first application requests to generate the first comparison response time of the first application request.

11. The method of claim 7, wherein the first and second application requests are asynchronous requests included in the first user interaction.

12. The method of claim 7, comprising, when a difference between the first average request response time and the first comparison request response time exceeds a correlation threshold, outputting a request alert indicating an application request issue.

13. The method of claim 7, comprising:
for the slow user interaction instances, averaging the request response times of the second application requests to generate a second average request response time of the second application request;
determining a second comparison request response time of the second application request; and
when a difference between the first average request response time of the first application request and the first comparison request response time is less than a first client threshold, and a difference between the second average request response time for the second application request and the second comparison request response time is less than a second client threshold, outputting a client alert indicating a client issue.

14. The method of claim 7, comprising:
for the slow user interaction instances, averaging the request response times of the second application requests to generate a second average request response time of the second application request;
determining a second comparison request response time of the second application request;
determining a first difference between the first average request response time for the first application request and the first comparison request response time;
determining a second difference between the second average request response time for the second application request and the second comparison request response time; and
when the first difference and the second difference are within a network threshold difference, outputting a network alert indicating a network issue.

15. A computing system, comprising:
a processor;
a communication component to receive a plurality of application requests from an application, and the processor to:
monitor via the plurality of application requests a plurality of instances of a user interaction with the application;
obtain a user interaction time for each of the plurality of instances of the user interaction;
create a plurality of temporal groupings that each comprise a time range based on a constant value and a multiplier;
match each of the instances of the user interaction with one of the temporal groupings using the user interaction time of the instance of the user interaction; and
for each of the temporal groupings:
determine an average request response time for a selected application request; and output a representation of the average request response time.

16. The computing system of claim 15, wherein a first application request of the plurality of application requests is a HyperText Transfer Protocol (HTTP) request to a first Uniform Resource Locator (URL).

17. The computing system of claim 16, wherein a second application request of the plurality of application requests is a HTTP request to a second URL.

18. The computing system of claim 15, the processor to:
for each of the temporal groupings:
  determine an average request response time for another application request; and
  output a representation of the average request response time for the another application request.

19. The non-transitory machine-readable storage medium of claim 4, wherein the second application operation is a HTTP request to a second URL.

20. The method of claim 7, wherein:
the first application request is a HyperText Transfer Protocol (HTTP) request to a first Uniform Resource Locator (URL); and
the second application request is a HTTP request to a second URL.

\* \* \* \* \*